(12) United States Patent
Killermann

(10) Patent No.: US 7,356,629 B2
(45) Date of Patent: Apr. 8, 2008

(54) CONVEYING DATA BETWEEN COMPUTING DEVICES

(75) Inventor: Udo Killermann, Hannover (DE)

(73) Assignee: Electronic Data Systems Corporation, Plano, TX (US)

( * ) Notice: Subject to any disclaimer, the term of this patent is extended or adjusted under 35 U.S.C. 154(b) by 1087 days.

(21) Appl. No.: 10/360,524

(22) Filed: Feb. 6, 2003

(65) Prior Publication Data

US 2004/0246967 A1 Dec. 9, 2004

(51) Int. Cl.
*G06F 13/42* (2006.01)
*G06F 13/00* (2006.01)

(52) U.S. Cl. .................. 710/105; 710/104; 710/36; 710/305; 709/227; 455/435.1

(58) Field of Classification Search ............ 455/435.1, 455/557; 710/8–14, 305–315, 36–38, 104–105; 370/338, 395.2; 709/227–229
See application file for complete search history.

(56) References Cited

U.S. PATENT DOCUMENTS 6,915,132 B2 * 7/2005 Chatterjee et al. ....... 455/435.1
2002/0032641 A1 * 3/2002 Mendiola et al. .......... 705/37
2002/0083228 A1 6/2002 Chiloyan et al.
2002/0159419 A1 10/2002 Morris
2002/0169002 A1 * 11/2002 Imbrie et al. ............... 455/557

FOREIGN PATENT DOCUMENTS

EP 1 126 378 8/2001
WO WO 02/088902 11/2002

OTHER PUBLICATIONS

PCT International Search Report, PCT/US2004/003225, Jan. 14, 2005, 4 pages.
Mark R. Walker, Jim Edwards, Michael Jeronimo, John G. Ritchie, Ylian Saint-Hilaire, Intel Technology Journal, Interoperable Home Infrastructure, "Remote I/O: Freeing the Experience From the Platform with UpnP Architecture", vol. 6, Issue 4, pp. 30-36, Published Nov. 15, 2002, ISSN 1535-766X.

* cited by examiner

*Primary Examiner*—Christopher Shin
(74) *Attorney, Agent, or Firm*—Fish & Richardson, PC

(57) ABSTRACT

Techniques are provided for conveying data between computing devices. In certain implementations, a system and method for conveying data between computing devices include the capability to, at a wireless terminal, generate a computer interface message containing peripheral device registration information, receive a computer interface message containing data for a peripheral device associated with the device registration information, and generate a wireless network message to convey the data to a peripheral device associated with the device registration information.

15 Claims, 5 Drawing Sheets

CONVEYING DATA BETWEEN COMPUTING DEVICES

TECHNICAL FIELD

This description relates to computing devices, and more particularly, to conveying data between computing devices.

BACKGROUND

Notebook computers, personal digital assistants, and the like are in common use. Unfortunately, the mobility of such devices places limitations on their ability to interact with other computing devices, such as, for example, printers, mass-storage devices, and high-performance computers, which tend to be less mobile. The limitations are caused principally by a lack of communication links between the mobile computing devices and other computing devices. To combat this problem, a cellular telephone may be used as a gateway to transfer data to a remote device.

SUMMARY

Techniques are provided for conveying data between computing devices. In one general aspect, a wireless terminal generates a computer interface message containing peripheral device registration information, receives a computer interface message containing data for a peripheral device associated with the device registration information, and generates a wireless network message to convey the data to a peripheral device associated with the device registration information.

In certain implementations, the wireless terminal also may initiate a computer interface session and receive a computer interface message containing a peripheral device registration request. The wireless terminal also might receive a wireless network message containing the peripheral device registration information and receive a wireless network message containing instructions that allow the wireless terminal to mimic at least some of the operations of a peripheral device associated with the device registration information. The wireless terminal additionally may receive a computer interface message requesting a peripheral device driver associated with the device registration information, generate a wireless network message requesting an associated peripheral device driver, receive a wireless network message containing an associated peripheral device driver, and generate a computer interface message containing the peripheral device driver. The wireless terminal also may receive a wireless network message containing registration information for a plurality of peripheral devices and generate a computer interface message containing the device registration information.

In particular implementations, a wireless network message comprises a code-division multiple access message, a computer interface message comprises a Universal Serial Bus message, and peripheral device registration information comprises an identifier for a peripheral device.

In another general aspect, a wireless network detects initiation of a wireless network session, determines whether the wireless network session is associated with a peripheral device, and generates a wireless network message containing peripheral device registration information if the wireless network session is associated with a peripheral device.

In certain implementations, the wireless network also may receive a wireless network message containing data for a peripheral device associated with the device registration information and generate a message to convey the data to a peripheral device associated with the device registration information. The wireless network also might receive a wireless network message requesting a peripheral device driver associated with the device registration information and generate a wireless network message containing an associated peripheral device driver. The wireless network additionally may generate a wireless network message containing instructions to allow a wireless terminal to mimic at least some of the operations of a peripheral device associated with the device registration information. To determine whether a wireless network session is associated with a peripheral device, the wireless network may examine a subscriber database.

In another general aspect, a system for conveying data between computing devices includes a wireless terminal and a wireless network. The wireless terminal is operable to initiate a wireless network session, receive a wireless network message containing peripheral device registration information, the information comprising a Plug-and-Play identifier, receive a wireless network message containing instructions that allow the wireless terminal to mimic at least some of the operations of a peripheral device associated with the device registration information, initiate a Universal Serial Bus computer interface session, receive a computer interface message containing a peripheral device registration request, generate a computer interface message containing the device registration information, receive a computer interface message requesting a peripheral device driver associated with the device registration information, generate a wireless network message requesting an associated peripheral device driver, receive a wireless network message containing an associated peripheral device driver, generate a computer interface message containing the peripheral device driver, receive a computer interface message containing data for a peripheral device associated with the device registration information, and generate a wireless network message to convey the data to a peripheral device associated with the registration information. The wireless network is operable to detect initiation of the wireless network session, determine whether the wireless network session is associated with a peripheral device, generate the wireless network message containing the device registration information if the wireless network session is associated with a peripheral device, generate the wireless network message containing the instructions if the wireless network session is associated with a peripheral device, receive the wireless network message requesting a peripheral device driver associated with the device registration information, generate the wireless network message containing an associated peripheral device driver, receive the wireless network message conveying the data to a peripheral device associated with the device registration information, and generate a message to convey the data to a peripheral device associated with the device registration information.

The details of one or more implementations of the invention are set forth in the accompanying drawings and the description below. Other features of the invention will be apparent from the description and drawings, and from the claims.

DESCRIPTION OF DRAWINGS

Like reference symbols in the various drawings indicate like elements.

DETAILED DESCRIPTION

Conveying data between computing devices includes conveying data from a computer, such as, for example, a notebook computer, to a remote peripheral device. Thus, a notebook computer may achieve its goal of providing computing power to a user at a user-selected location, while still offering the user access to peripheral devices that are not necessarily as mobile. However, conveying data between computing devices is not limited to notebook computers and remote peripheral devices and may include conveying data between any types of computing devices at any distance apart.

Figure 1:
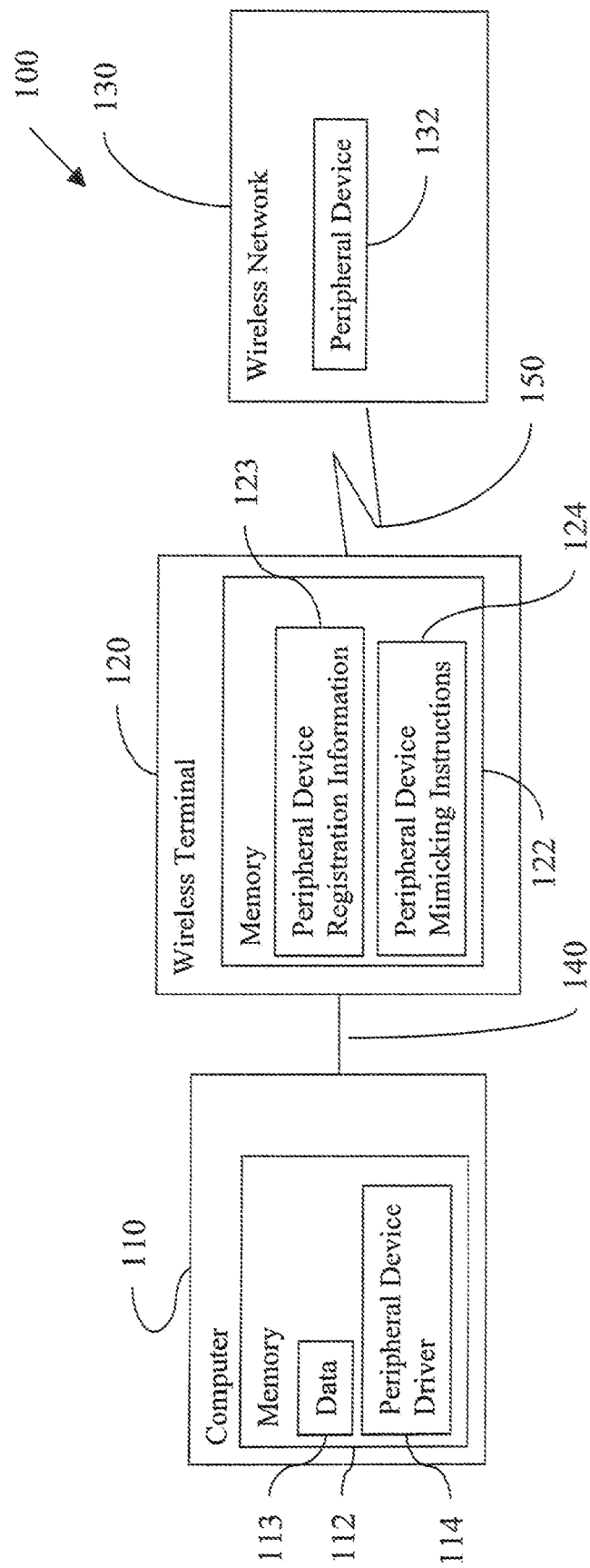
FIG. 1 is a block diagram illustrating a system for conveying data between computing devices.

FIG. 1 illustrates a system 100 for conveying data between computing devices. In general, system 100 includes a computer 110, a wireless terminal 120, and a wireless network 130. In operation, computer 110 contains data that needs to be transferred to a peripheral device to which the computer is not connected. To achieve the transfer, wireless terminal 120 presents itself to computer 110 as the peripheral device, obtains the data, and transfers the data to wireless network 130, which transfers the data to the peripheral device. The transfer of the data to wireless network 130 by wireless terminal 120 is generally opaque to computer 110.

In more detail, computer 110 includes memory 112, which may include random access memory (RAM), read-only memory (ROM), compact-disk read-only memory (CD-ROM), registers, and/or any other appropriate volatile or non-volatile information storage device. Memory 112 stores data 113 that needs to be transferred to a peripheral device and a peripheral device driver 114 that is associated with the peripheral device. Data 113 may be generated and/or stored by computer 110 and may be text, audio, graphics, video, statistics, measurements, and/or any other appropriate information that a peripheral device may use. Peripheral device driver 114 may be any appropriate driver for a peripheral device. In particular embodiments, peripheral device driver 114 is a Plug-and-Play (PNP) driver. The peripheral device driver may be stored permanently in memory 112, received from wireless network 130, or otherwise captured in memory 112. Memory 112 may also store information and/or instructions for computer 110.

Computer 110 additionally includes devices for facilitating the manipulation and/or transfer of information. For example, computer 110 may include a processor, such as, for example, an analog processor, a digital processor, a biological processor, an atomic processor, or any other appropriate device for manipulating information in a logical manner, and a communication interface, such as, for example, a network interface card, a modem, a transceiver, or any other appropriate device for sending and/or receiving information. Computer 110 may be a personal digital assistant (PDA), a personal computer (PC), a Unix-based computer, or any other appropriate computing device. In particular implementations, computer 110 is a notebook computer running Windows™ 2000 or XP.

Computer 110 is coupled to wireless terminal 120 by a link 140. Link 140 may be metallic wire, such as for example, a Universal Serial Bus (USB) or an IEEE 1394 bus, a fiber-optic wire, an electromagnetic wireless channel, such as, for example, a Bluetooth™ channel or an infrared wireless channel, or any other appropriate type of wireline or wireless path for transferring information.

Wireless terminal 120 includes memory 122, which may include RAM, ROM, CD-ROM, registers, and/or any other appropriate volatile or non-volatile information storage device. Memory 122 stores peripheral device registration information 123 and peripheral device mimicking instructions 124. Registration information 123 and mimicking instructions 124 are used by wireless terminal 120 to interact with computer 110 as the associated peripheral device would. Thus, wireless terminal 120 may appear to computer 110 to have capabilities beyond its own innate ones. Registration information 123 may be stored permanently in memory 122, received from wireless network 130, or otherwise captured in memory 122. In particular implementations, registration information 123 includes a peripheral device identifier, such as, for example, a PNP identifier. Mimicking instructions 124 allow wireless terminal 120 to mimic at least some of the operations of a peripheral device. For example, because computer 110 may believe that wireless terminal 120 is the peripheral device associated with the registration information, wireless terminal 120 may mimic the inputs and outputs of the associated peripheral device. In particular implementations, mimicking instructions 124 may allow wireless terminal 120 to mimic PNP services of a peripheral device. Furthermore, mimicking instructions 124 may allow wireless terminal 120 to send data to peripheral device 132. For example, the instructions may inform the wireless terminal how to format data for transmission to the peripheral device and may include an address for the peripheral device. For instance, the instructions may package the data into an IP format. Instructions 124 may be stored permanently in memory 122, received from wireless network 130, or otherwise captured in memory 122. Memory 122 may also store other information and/or instructions for wireless terminal 120.

Wireless terminal 120 also includes devices for facilitating the manipulation and/or transfer of information. For example, wireless terminal 120 may include a processor such as those noted above, a communication interface, such as, for example, a network interface card, a modem, a transceiver, or any other appropriate device for sending and/or receiving information, and a wireless network communication interface, such as, for example, a wireless transceiver or any other appropriate device for wirelessly sending and/or receiving information. In particular implementations, wireless terminal 120 is an advanced cellular telephone, such as, for example, a Smartphone from Microsoft™.

Wireless terminal 120 is coupled to wireless network 130 by a wireless link 150. Link 150 may be an radio-frequency (RF) wireless channel, such as, for example, a time-division multiple access (TDMA) channel or a code-division multiple access (CDMA) channel, an infrared wireless channel, or any other appropriate wireless path for transferring information. Information may be sent across link 150 according to any appropriate protocol, such as, for example, the Internet protocol (IP), and may be secured by RSA encryption or any other appropriate type of security protocol.

Wireless network 130 includes a peripheral device 132. Peripheral device 132 may be a mass storage device, a printer, a high-performance computer, or any other appropriate device that can use received data and/or output data. Note that a peripheral device such as a mass storage device or a high-performance computer may also send data to computer 110. In general, wireless network 130 may include any number of peripheral devices. In particular implementations, a peripheral device may be coupled to wireless network 130 by a communication network, such as, for example, the Internet.

Wireless network 130 also includes devices for facilitating the receipt and transfer of information to peripheral device 132. For example, wireless network 130 may include transceivers, switching centers, packet data servers, and/or any other appropriate devices for receiving and transferring information. In particular implementations, wireless network 130 may be TDMA network, such as, for example, a Global System for Mobile (GSM) network, an IS-136 network, a General Packet Radio Service (GPRS) network, or a High Speed Circuit Switched Data network (HSCSD), a CDMA network, such, as for example, an IS-95 network or a Universal Mobile Telecommunications System (UMTS) network, or any type of 2.5G or 3G network.

In one mode of operation, wireless terminal 120 initiates a wireless network session with wireless network 130. The initiation may be automatic, in response to a user command, or otherwise. The wireless terminal and the wireless network may establish a wireless network session by conventional means. In particular implementations, however, wireless network 130 may send peripheral device registration information 123 and/or peripheral device mimicking instructions 124 to wireless terminal 120 while establishing the session.

Additionally, wireless terminal 120 initiates a computer interface session with computer 110, possibly upon connection thereto. When computer 110, possibly by using a Basic Input/Output System (BIOS), detects the presence of wireless terminal 120, the computer, possibly by using its operating system, generates and sends a registration request to wireless terminal 120. The registration may ask the wireless terminal to enumerate and register its capabilities. In response, wireless terminal 120 generates and sends a message containing peripheral device registration information 123 to the computer. Computer 110 then registers wireless terminal 120 as the associated peripheral device, which is actually peripheral device 132.

Computer 110 also determines whether it has an appropriate device driver. If not, computer 110 generates a message requesting a device driver associated with the peripheral device registration information and sends the message to wireless terminal 120. The wireless terminal then generates and sends a wireless network message requesting an appropriate device driver from wireless network 130, initiating a wireless network session if necessary. Wireless network 130 then sends a device driver associated with the peripheral device registration information to wireless terminal 120. Upon receiving the device driver, wireless terminal 120 generates and sends to computer 110 a message containing the driver.

After this, wireless terminal 120 should be registered, configured, and ready to use as the associated peripheral device, at least from the computer's point of view. Computer 110 may, accordingly, present the peripheral device to a user as a local device. In particular implementations, wireless terminal 120 mimics PNP services to accomplish the registration and configuration.

When data is to be sent to peripheral device 132, computer 110, using device driver 114, generates and sends a message containing the data to wireless terminal 120. Wireless terminal 120 then generates a wireless network message containing the data and sends the message to wireless network 130. Wireless network 130 then sends the data to peripheral device 132.

The implementation illustrated by FIG. 1 has a variety of features. For example, because wireless terminal 120 provides access to peripheral device 132, computer 110 has expanded capabilities. Moreover, the capabilities may be provided by a peripheral device that is remote, allowing computer 110 to be more mobile while still retaining the capabilities. Note that computer 110 may be able to interface with different wireless terminals; thus, the computer and wireless terminal 120 do not have to be a pair. Furthermore, if wireless terminal 120 is mobile, a user of wireless terminal 120 may carry around his "personal" peripheral device context. This could be especially beneficial for a mobile user, because peripheral devices, especially high-end ones, are often not very mobile. As an additional example, because many wireless networks already have invested large amounts of capital in smart network infrastructure for bandwidth, storage, computing, printing, and the like, allowing computers to tap these resources allows the wireless networks to be more fully utilized. Moreover, this may provide a revenue stream to wireless network operators, allowing billing based on service type, air time, transfer speed, and/or any other appropriate usage criterion. In particular embodiments, wireless terminal 120 may mimic a PNP device to leverage the capabilities of system 100.

In certain implementations, wireless terminal 120 may present itself as one of several peripheral devices to computer 110. Furthermore, wireless terminal 120 may contemporaneously present itself as more than one peripheral device. These attributes may provide a user of computer 110 with a variety of capabilities from which to select. For instance, wireless terminal 120 may be able to present itself as a variety of printers, which may have different features, such as print quality. Thus, a user may have the option to select which printer, and hence features, to use.

In some implementations, a peripheral device may need to send data to computer 110. For example, a measurement instrument in the field may need to send data to computer 110, although any appropriate type of peripheral device might need to do the same. This may occur automatically, in response to a user request, or otherwise. However, once wireless terminal 120 has registered itself as the peripheral device with computer 110 and established a session with wireless network 130, this should be a relatively straightforward task. In certain of these implementations, computer 110 may or may not have data to send to the peripheral device.

In particular implementations, services provided by virtual devices are not limited to mimicking a physical device. For example, the services may be part of a value chain triggered by a user request and fulfilled by service providers coordinated by the wireless network provider. For instance, a print job may specify that it is to be printed and delivered by a certain time. Such parameters could be entered in the standard printer dialog of Windows™ 2000 or XP, for example. The wireless network provider may then reverse auction the job, either manually or automatically, to connected print shops, and send the job to the appropriate one, charging a fee to the user as well as the connected service partner.

Figure 2:
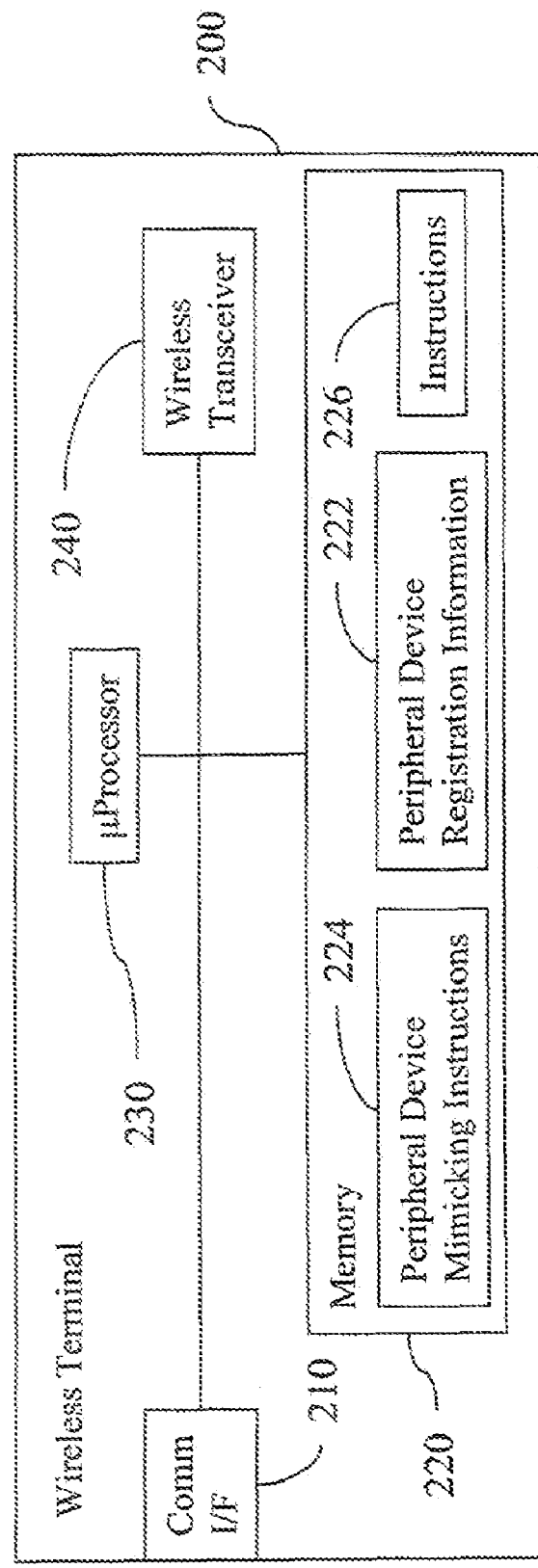
FIG. 2 is a block diagram illustrating a wireless terminal.

FIG. 2 illustrates a wireless terminal 200 that is operable to receive data from a computer and convey the data wirelessly to a wireless network. Wireless terminal 200 may be used in a system similar to that of FIG. 1.

In more detail, wireless terminal 200 includes a communication interface 210, memory 220, a microprocessor 230, and a wireless transceiver 240. Communication interface 210 may be a network interface card, a modem, a transceiver, or any other type of device for sending and receiving information through a computer port. In particular implementations, communication interface 210 is a USB interface card. Memory 220 may include RAM, ROM, CD-ROM, registers, and/or any other type of volatile or non-volatile information storage device. Memory 220 stores peripheral device registration information 222, which may include a PNP identifier in particular implementations, peripheral device mimicking instructions 224, and instructions 226, for the general operation of the wireless terminal. Memory 220 may also store a variety of other information and/or instructions. Microprocessor 230 is responsible for the higher-level operations of wireless terminal 200. Microprocessor 230 may be a reduced instruction set computer (RISC), a complex instruction set computer (CISC), or any other appropriate type of digital device for manipulating information in a logical manner. Wireless transceiver 240 is responsible for sending information to and receiving information from a wireless network. Wireless transceiver 240 may be any appropriate device for exchanging information by the use of wireless electromagnetic signals.

In one mode of operation, wireless terminal 200 facilitates the conveyance of data from a connected computer to a wireless network that conveys the data to a peripheral device, which may or may not be part of a wireless network. To accomplish this, wireless terminal 200 establishes communication sessions with both the computer and the wireless network, typically, although not always, at the same time.

To establish a communication session with a wireless network, microprocessor 230, according to instructions 226, initiates a wireless network session through wireless transceiver 240. The session may be initiated automatically, upon the detection of a user command, or otherwise. Microprocessor 230 may carry out any other appropriate functions to establish the wireless network session, such as, for example, validation and channel assignment. Microprocessor 230 is also able to detect the receipt of a wireless network message containing registration information 222 and/or mimicking instructions 224, and store them in memory 220. Note that the peripheral device registration information and/or peripheral device mimicking instructions may be received every time microprocessor 230 establishes a wireless network session, the first time microprocessor 230 establishes a wireless network session, at a designated interval, upon the occurrence of a designated event, or otherwise. In certain implementations, however, the registration information and/or mimicking instructions may be requested by the wireless terminal. Also, note that a message from and/or to a wireless network may have one or more segments.

To establish a communication session with a computer, microprocessor 230, according to peripheral device mimicking instructions 224, initiates a session with the computer through communication interface 210, possibly upon connection to the computer. The session may be initiated automatically, upon the detection of a user command, or otherwise. Microprocessor 230 may carry out any other appropriate functions to establish the interface session. Microprocessor 230 also responds to a computer-initiated message containing a request to enumerate and register the wireless terminal's capabilities. To accomplish this, microprocessor 230 generates and sends a computer interface message containing registration information 222, which was received in a wireless network message, through communication interface 210. After this, wireless terminal 200 could appear to the computer as the peripheral device associated with the registration information. Note that a message from and/or to a computer may have one or more segments.

Microprocessor 230 additionally responds to a computer-initiated message containing a request for a device driver associated with the peripheral device registration information. To accomplish this, microprocessor 230 generates a wireless network message requesting an appropriate device driver and sends the message to the wireless network through wireless transceiver 240. Then, when a wireless network message containing an appropriate device driver arrives through wireless transceiver 240, microprocessor 230 generates a message containing the device driver and sends the message to the computer through communication interface 210.

When data is to be sent to the peripheral device associated with registration information 222, the data arrives through communication interface 210 in a computer interface message. Microprocessor 230 interprets the message according to instructions 224 and then generates and sends a wireless network message containing the data through wireless transceiver 240.

Wireless terminal 200 has a variety of features. For example, by being able to obtain peripheral device registration information 222 and peripheral device mimicking instructions 224 from a wireless network, the wireless terminal may provide access to a variety of peripheral devices without having to maintain the information. This gives the wireless terminal more flexibility. Moreover, the accessible peripheral device may change with changes to a user's wireless network subscription. Thus, the capabilities available to a user may be tailored. As another example, a computer that the wireless terminal is servicing may be upgraded to access the peripheral device when necessary. Thus, a computer is not limited by its currently stored peripheral device information.

Figure 3:
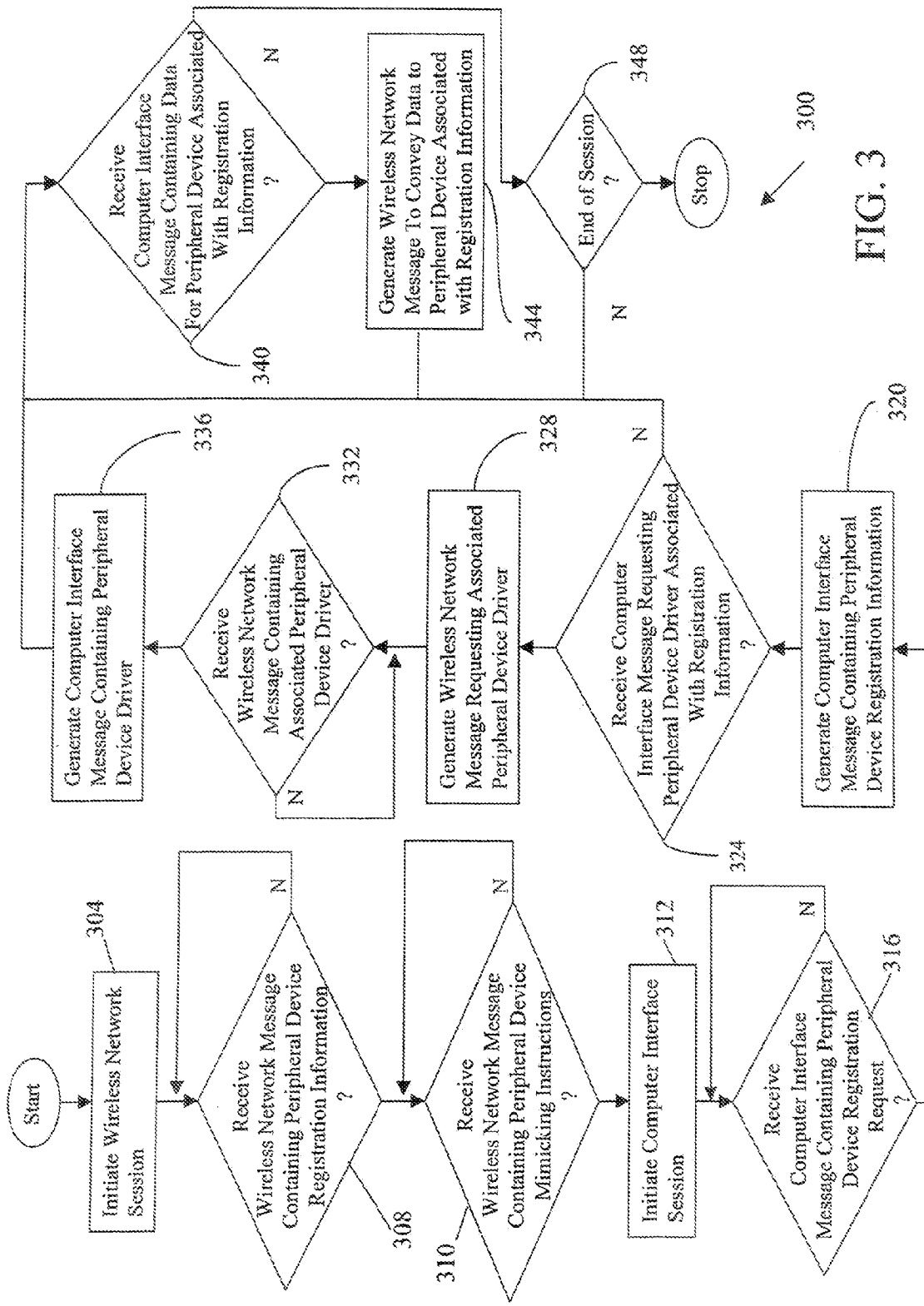
FIG. 3 is a flowchart illustrating a method for conveying data between computing devices.

FIG. 3 is a flowchart illustrating a method 300 for conveying data between computing devices. Method 300 could describe the operations of a wireless terminal similar to wireless terminal 120 of FIG. 1.

The method begins with a wireless terminal initiating a wireless network session (step 304). A wireless network session may be a registration session, a data exchange session, a voice exchange session, or any other appropriate wireless network session. A session may be initiated, for example, by generating a control channel message indicating the presence of the wireless terminal, by generating a control channel message indicating the desire to establish a data channel, or by generating a control channel message indicating the desire to establish a voice channel. The initiation may occur automatically, in response to a user command, or otherwise.

The wireless terminal then waits to receive a wireless network message containing peripheral device registration information (step 308). The registration information may include an identifier, which could be a PNP identifier, that is able to identify the wireless terminal as a peripheral device. The wireless terminal also waits to receive a wireless network message containing instructions for mimicking a peripheral device associated with the registration information (step 310). The instructions are operable to allow the wireless terminal to mimic at least some of the operations of a peripheral device associated with the registration information. Furthermore, the instructions may inform the wireless terminal how to format messages for transmission to a remote peripheral device. The registration information and instructions may, for example, arrive in a control channel message. The peripheral device itself may be part of a wireless network or coupled to a wireless network.

The wireless terminal then initiates a computer interface session (step 312). In particular implementations, the session is a USB session. The session may be initiated automatically, upon a user command, or otherwise. After initiating the computer interface session, the wireless terminal waits to receive a computer interface message containing a peripheral device registration request (step 316). The request could, for example, query a wireless terminal to enumerate and register its capabilities. The wireless terminal then generates a computer interface message containing the peripheral device registration information (step 320). The message may then be sent to the computer.

The wireless terminal then determines whether a computer interface message requesting a peripheral device driver associated with the registration information has been received (step 324). If a request for such a device driver has been received, the wireless terminal generates a wireless network message requesting a peripheral device driver associated with the registration information (step 328). The message may then be sent to the wireless network.

The wireless terminal then waits to receive a wireless network message containing an associated peripheral device driver (step 332). Upon receiving an associated peripheral device driver, the wireless terminal generates a computer interface message containing the device driver (step 336). The message may then be sent to the computer.

After generating the computer interface message containing the device driver, or if a computer interface message requesting a peripheral device driver associated with the registration information has not been received, the wireless terminal determines whether a computer interface message containing data for a peripheral device associated with the registration information has been received (step 340). The data could be text, audio, graphics, video, statistics, measurements, and/or any other appropriate type of information that a peripheral device may use. If such data has been received, the wireless terminal generates a wireless network message to convey the data to a peripheral device associated with the registration information (step 344). After this, the wireless terminal may send the message to the wireless network. The wireless terminal then checks for another message (step 340).

If, however, such data has not been received, the wireless terminal determines whether the session has ended (step 348). Determining whether the session has ended may be accomplished by detecting a wireless network message indicating that the data transfer is complete, by determining that a timeout has occurred, or otherwise. If the session has ended, the method ends. However, if the session has not ended, the wireless terminal waits for another message (step 340).

Although FIG. 3 illustrates one implementation of a method for conveying data between computing devices, other implementations may include fewer, more, and/or a different arrangement of operations. For example, a wireless terminal may store the peripheral device registration information and/or mimicking instructions for later use, and steps 308 and 310 may be unnecessary or may only be performed an initial time. As another example, the peripheral device registration information may be included in the initiation of the computer interface session, and steps 316 and 320 may be unnecessary. As a further example, the computer interface session may be initiated before the wireless network session, and steps 304 and 308 may occur after step 316. As an additional example, the associated peripheral device driver may be stored at the wireless terminal, and steps 328 and 332 may be unnecessary. Furthermore, the peripheral device driver may be stored at a computer, and step 336 may be unnecessary. As another example, the wireless terminal may identify itself as a variety of peripheral devices, and may have to provide several device drivers and to generate wireless messages associated with different peripheral device registration information.

Figure 4:
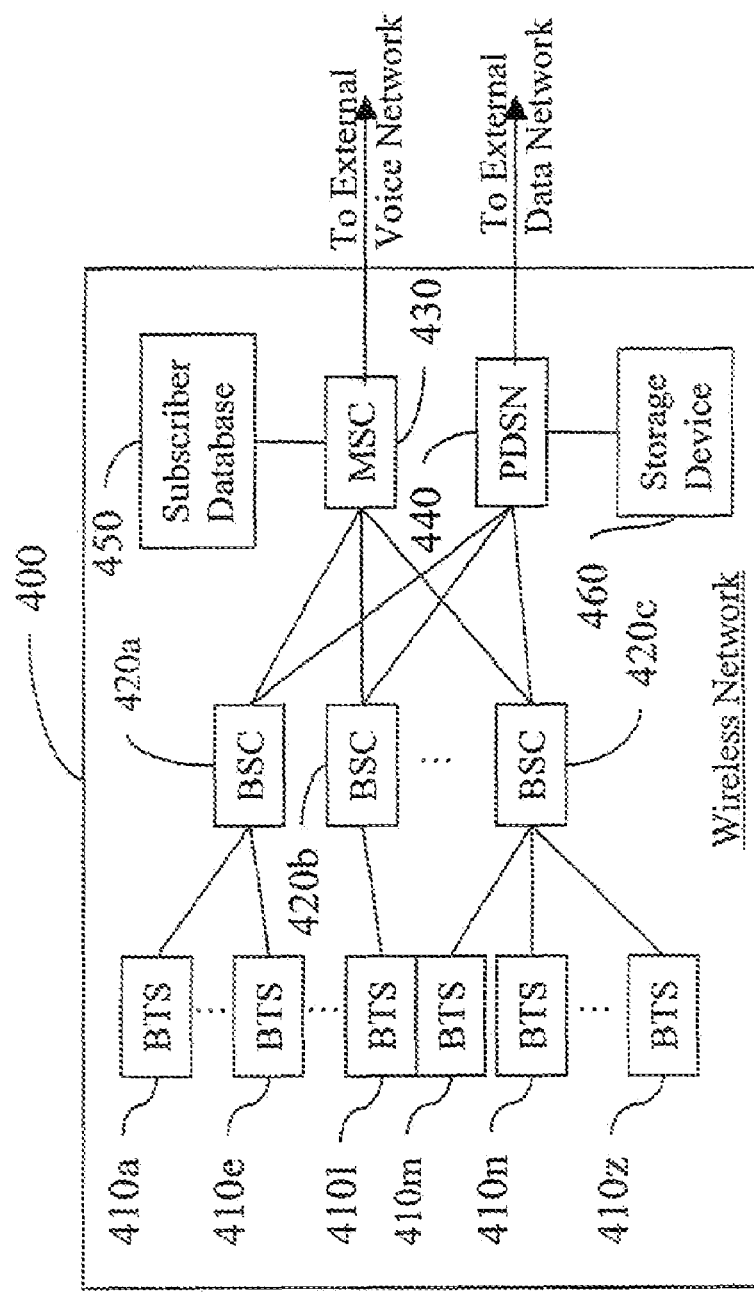
FIG. 4 is a block diagram illustrating a wireless network.

FIG. 4 illustrates a wireless network 400 that is operable to wirelessly receive data and convey it within the wireless network or to other appropriate networks. Wireless network 400 may be used in a system such as the system of FIG. 1.

In more detail, wireless network 400 includes base transceiver stations (BTSs) 410, base station controllers (BSCs) 420, a mobile switching center (MSC) 430, and a packet data serving node (PDSN) 440. BTSs 410 are responsible for the actual conveyance of wireless electromagnetic signals from and to wireless terminals. The signals could contain any type of information. BSCs 420, in turn, are responsible for analyzing messages, which could contain any type of information, from wireless terminals and sending them to the appropriate one of MSC 430 and PDSN 440. Additionally, BSCs 420 are responsible for analyzing messages from MSC 430 and PDSN 440 and sending them to the appropriate one of BTSs 410. Each of BSCs 420 is coupled to one or more of BTSs 410. MSC 430 is responsible for establishing wireless network sessions with wireless terminals and conveying voice data within wireless network 400 or to an external voice network, such as, for example, a public switched telephone network (PSTN). Additionally, MSC 430 is responsible for handling handoffs between BTSs 410 if a wireless terminal moves between them during a session. To accomplish its functions, MSC 430 is coupled to a subscriber database 450.

Subscriber database 450 may contain any appropriate information about a subscriber, such as for example, available service plan, which may include associated peripheral device registration information, and validation data. An entry for a user in the subscriber database may be established when the user registers for wireless services and may be updated as needed, possibly by using on-line, such as, for example, Web interface, techniques. In particular implementations subscriber database 450 is a home location register (HLR). A virtual device database in the network may be used for storage and retrieval of the device drivers and mimicking instructions.

PDSN 440, in turn, is responsible for conveying data within wireless network 400, including to and from a peripheral device. In the illustrated implementation, a storage device 460, which could serve as a peripheral device, is directly coupled to PDSN 440. Storage device 460 may be any appropriate type of memory. Additionally, PDSN 440 may send data to and receive data from an external data network, such as for, example, the Internet, so that data may be sent to and received from other devices, including peripheral devices.

Figure 5:
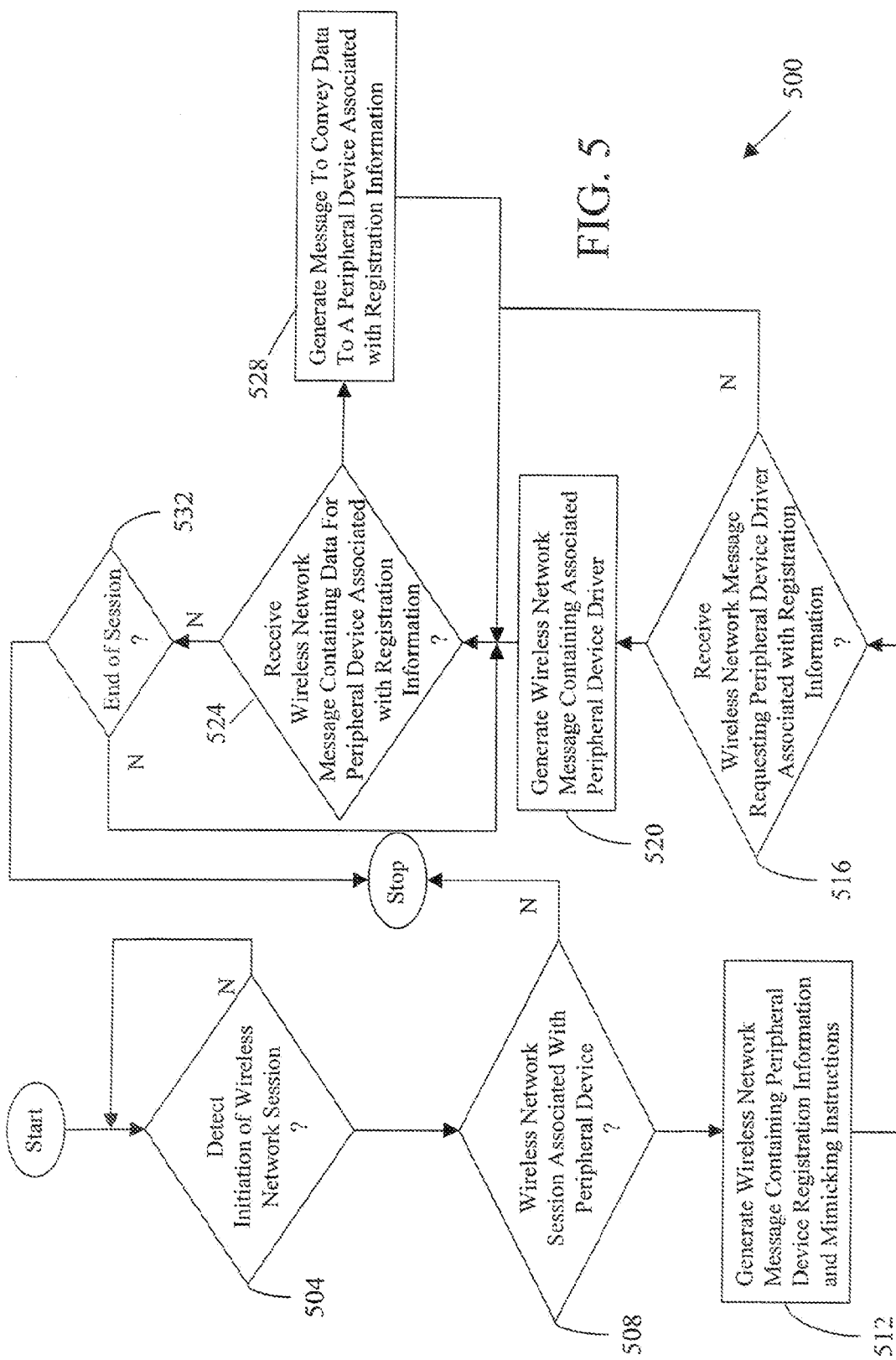
FIG. 5 is a flowchart illustrating another method for conveying data between computing devices.

FIG. 5 is a flowchart illustrating a method 500 for conveying data between computing devices. Method 500 may describe the operations of a wireless network similar to wireless network 130 of FIG. 1.

The method begins with a wireless network waiting to detect initiation of a wireless network session (step 504). A wireless network session may be a registration session for a wireless terminal, a data exchange session for a wireless terminal, a voice exchange session for a wireless terminal, or any other appropriate wireless network session. Detecting initiation of a wireless network session may entail, for example, detecting a control channel message indicating the presence of the wireless terminal, detecting a control channel message indicating the desire to establish a data channel, or detecting a control channel message indicating the desire to establish a voice channel.

The wireless network then determines whether the wireless network session is associated with a peripheral device (step 508). This determination may be made, for example, by examining a subscriber database based on an identifier for a mobile unit and/or subscriber—such as for example, an International Mobile Subscriber Identifier (IMSI), an Electronic Serial Number (ESN), or a Mobile Identification Number (MIN)—associated with the wireless network session. In some implementations, the examination may entail determining whether peripheral device registration information is associated with the session-associated identifier. If the wireless network session is not associated with a peripheral device, the method ends. If, however, the wireless network session is associated with a peripheral device, the wireless network generates a wireless network message containing peripheral device registration information and peripheral device mimicking instructions (step 512). The message may then be sent to a wireless terminal.

The wireless network then determines whether a wireless network message requesting a peripheral device driver associated with the registration information has been received (step 516). If such a message has been received, the message calls for generating a wireless network message containing a peripheral device driver associated with the peripheral device registration information (step 520). The message may then be sent to a wireless terminal.

The wireless network then determines whether a wireless network message containing data for a peripheral device associated with the registration information has been received (step 524). The determination may be made, for example, by examining a destination address, source address, and/or data type for the message. The data may be text, audio, graphics, video, statistics, measurements, and/or any other appropriate information that a peripheral device may use. If a wireless network message containing data for a peripheral device has been received, the wireless network generates a message to convey the data to a peripheral device associated with the registration information (step 528). This may involve converting the message from a wireless format to an IP format, for example. The message may then be sent to the peripheral device, which may or may not be part of the wireless network. The wireless network then checks for another message (step 524).

If, however, a wireless network message containing data for a peripheral device associated with the registration information has not been received, the wireless network determines whether the session has ended (step 532). Determining whether the session has ended may be accomplished by detecting a wireless network message indicating that the data transfer is complete, by determining that a timeout has occurred, or otherwise. If the session has ended, the method is at an end. But if the session has not ended, the wireless network checks for another message (step 524).

Although FIG. 5 illustrates one implementation of a method for conveying data between computing devices, other implementations may include fewer, more, and/or a different arrangement of operations. For example, if associated wireless terminals already contain peripheral device registration information and/or mimicking instructions, step 512 may be eliminated and/or modified. Moreover, the registration information and mimicking instructions may be sent in separate messages. As another example, the associated device driver may be sent with the peripheral device registration information, eliminating steps 516 and 520. As an additional example, data for several peripheral devices may be received, which may entail sorting the data before generating messages to convey the data. Furthermore, steps 504-520 could be eliminated. A variety of other examples exist.

A number of implementations have been described. Other implementations are within the scope of the following claims.

What is claimed is:

1. A method performed by a wireless terminal for conveying data between computing devices, the method comprising:
   initiating a wireless network session;
   receiving a wireless network message containing peripheral device registration information;
   generating a computer interface message containing the device registration information;
   receiving a computer interface message containing data for a peripheral device associated with the device registration information; and
   generating a wireless network message to convey the data to a peripheral device associated with the device registration information.

2. The method of claim 1, further comprising:
   initiating a computer interface session; and
   receiving a computer interface message containing a peripheral device registration request.

3. The method of claim 1, wherein peripheral device registration information comprises an identifier for a peripheral device.

4. The method of claim 1, further comprising receiving a wireless network message containing instructions that allow the wireless terminal to mimic at least some of the operations of a peripheral device associated with the device registration information.

5. The method of claim 1, wherein the wireless network messages comprise code-division multiple access messages.

6. The method of claim 1, wherein the computer interface messages comprise Universal Serial Bus messages.

7. The method of claim 1, further comprising:
   receiving a computer interface message requesting a peripheral device driver associated with the device registration information;
   generating a wireless network message requesting an associated peripheral device driver;
   receiving a wireless network message containing an associated peripheral device driver; and
   generating a computer interface message containing the received peripheral device driver.

8. The method of claim 1, further comprising:
   receiving a wireless network message containing registration information for a plurality of peripheral devices; and
   generating a computer interface message containing the device registration information.

9. A system for conveying data between computing devices, the system comprising:
   a wireless terminal operable to:
      initiate a wireless network session,
      receive a wireless network message containing peripheral device registration information,
      generate a computer interface message containing the device registration information,
      receive a computer interface message containing data for a peripheral device associated with the device registration information, and generate a wireless network message to convey the data to a peripheral device associated with the device registration information.

10. The system of claim 9, wherein the wireless terminal is further operable to receive a wireless network message containing instructions that allow the wireless terminal to mimic at least some of the operations of a peripheral device associated with the device registration information.

11. The system of claim 9, wherein the wireless terminal is further operable to:
receive a computer interface message requesting a peripheral device driver associated with the device registration information;
generate a wireless network message requesting an associated peripheral device driver;
receive a wireless network message containing an associated peripheral device driver; and
generate a computer interface message containing the received peripheral device driver.

12. The system of claim 9, wherein the wireless terminal is further operable to:
receive a wireless network message containing registration information for a plurality of peripheral devices; and
generate a computer interface message containing the device registration information.

13. A system for conveying data between computing devices, the system comprising:
a wireless terminal operable to:
initiate a wireless network session,
receive a wireless network message containing peripheral device registration information, the information comprising a Plug-aid-Play identifier,
receive a wireless network message containing instructions that allow the wireless terminal to mimic at least some of the operations of a peripheral device associated with the device registration information,
initiate a Universal Serial Bus computer interface session,
receive a computer interface message containing a peripheral device registration request,
generate a computer interface message containing the device registration information,
receive a computer interface message requesting a peripheral device driver associated with the device registration information,
generate a wireless network message requesting an associated peripheral device driver,
receive a wireless network message containing an associated peripheral device driver,
generate a computer interface message containing the received peripheral device driver,
receive a computer interface message containing data for a peripheral device associated with the device registration information, and
generate a wireless network message to convey the data to a peripheral device associated with the device registration information; and
a wireless network operable to:
detect initiation of the wireless network session,
determine whether the wireless network session is associated with a peripheral device,
generate the wireless network message containing the device registration information if the wireless network session is associated with a peripheral device,
generate the wireless network message containing the instructions if the wireless network session is associated with a peripheral device,
receive the wireless network message requesting a peripheral device driver associated with the device registration information,
generate the wireless network message containing an associated peripheral device driver,
receive the wireless network message conveying the data to a peripheral device associated with the device registration information, and
generate a message to convey the data to a peripheral device associated with the device registration information.

14. The method of claim 1, further comprising:
generating a wireless message comprising an identifier associated with a peripheral device; and
receiving a wireless message comprising peripheral device registration information associated with the identifier.

15. The system of claim 9, wherein the wireless terminal is further operable to:
generate a wireless message comprising an identifier associated with a peripheral device; and
receive a wireless message comprising peripheral device registration information associated with the identifier.

* * * * *